US010380343B1

United States Patent
Jung et al.

(10) Patent No.: US 10,380,343 B1
(45) Date of Patent: *Aug. 13, 2019

(54) SYSTEM AND METHOD FOR PROGRAMMATIC RUNTIME DE-OBFUSCATION OF OBFUSCATED SOFTWARE UTILIZING VIRTUAL MACHINE INTROSPECTION AND MANIPULATION OF VIRTUAL MACHINE GUEST MEMORY PERMISSIONS

(71) Applicant: FireEye, Inc., Milpitas, CA (US)

(72) Inventors: Robert Jung, Albuquerque, NM (US); Antony Saba, Albuquerque, NM (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,200

(22) Filed: Oct. 3, 2016

Related U.S. Application Data

(63) Continuation of application No. 13/892,800, filed on May 13, 2013, now Pat. No. 9,459,901.

(Continued)

(51) Int. Cl.
*G06F 21/56* (2013.01)
*G06F 9/455* (2018.01)

(52) U.S. Cl.
CPC ........ *G06F 21/566* (2013.01); *G06F 9/45558* (2013.01); *G06F 2009/45583* (2013.01); *G06F 2221/033* (2013.01)

(58) Field of Classification Search
CPC ............... G06F 21/566; G06F 9/45558; G06F 2221/033; G06F 2009/45583
See application file for complete search history.

(56) References Cited

U.S. PATENT DOCUMENTS 7,383,443 B2 * 6/2008 Zeman .................... G06F 21/14
713/167
7,937,387 B2 * 5/2011 Frazier .................. G06F 21/645
707/722

(Continued)

FOREIGN PATENT DOCUMENTS

EP 03-101037 A1 12/2003
KR 10-2010-0010749 4/2011

OTHER PUBLICATIONS

EP 13866903.1 filed Dec. 26, 2013 Extended European Search Report dated Jun. 17, 2016.

(Continued)

*Primary Examiner* — Joseph P Hirl
*Assistant Examiner* — J. Brant Murphy
(74) *Attorney, Agent, or Firm* — Rutan & Tucker, LLP

(57) ABSTRACT

A system and method for performing runtime de-obfuscation of obfuscated malicious software code in a virtual machine is described. According to one embodiment, the method involves enumerating a first physical page associated with a first virtual address space of a first piece of analyzed software code. Herein, the first virtual address space is a portion of a virtual address space associated with the virtual machine. Thereafter, the first physical page is set a non-writable permission. Hence, upon detection of a write to the first physical page by the first piece of analyzed software code, a determination can be made that the first piece of analyzed software code may be categorized as malicious software code.

20 Claims, 1 Drawing Sheet

Related U.S. Application Data

(60) Provisional application No. 61/747,796, filed on Dec. 31, 2012, provisional application No. 61/747,114, filed on Dec. 28, 2012.

(56) References Cited

U.S. PATENT DOCUMENTS

| | | | | |
|---|---|---|---|---|
| 8,069,484 | B2* | 11/2011 | McMillan | G06F 21/563 |
| | | | | 713/194 |
| 8,104,089 | B1* | 1/2012 | Guo | G06F 12/14 |
| | | | | 713/188 |
| 8,151,352 | B1* | 4/2012 | Novitchi | G06F 9/45508 |
| | | | | 717/138 |
| 8,566,476 | B2* | 10/2013 | Shiffer | G06F 17/30 |
| | | | | 709/246 |
| 8,713,681 | B2* | 4/2014 | Silberman | G06F 21/56 |
| | | | | 713/165 |
| 8,793,278 | B2 | 7/2014 | Frazier et al. | |
| 8,881,271 | B2* | 11/2014 | Butler, II | G06F 21/577 |
| | | | | 713/165 |
| 8,949,257 | B2* | 2/2015 | Shiffer | G06F 17/30675 |
| | | | | 707/756 |
| 9,106,630 | B2* | 8/2015 | Frazier | H04L 63/08 |
| 9,135,457 | B1* | 9/2015 | Arnaudov | G06F 21/604 |
| 9,213,651 | B2* | 12/2015 | Malyugin | G06F 12/1027 |
| 9,268,936 | B2* | 2/2016 | Butler | G06F 21/554 |
| 9,275,229 | B2* | 3/2016 | LeMasters | G06F 21/572 |
| 9,459,901 | B2 | 10/2016 | Jung et al. | |
| 2005/0172337 | A1* | 8/2005 | Bodorin | G06F 21/56 |
| | | | | 726/22 |
| 2007/0006228 | A1 | 1/2007 | Grobman et al. | |
| 2007/0271610 | A1* | 11/2007 | Grobman | G06F 21/53 |
| | | | | 726/22 |
| 2007/0283115 | A1* | 12/2007 | Freeman | G06F 12/1475 |
| | | | | 711/163 |
| 2008/0168562 | A1* | 7/2008 | Haga | G06F 21/14 |
| | | | | 726/23 |
| 2008/0216175 | A1 | 9/2008 | Pike | |
| 2008/0320594 | A1* | 12/2008 | Jiang | G06F 21/566 |
| | | | | 726/24 |
| 2010/0088474 | A1* | 4/2010 | Agesen | G06F 9/45537 |
| | | | | 711/147 |
| 2010/0191888 | A1* | 7/2010 | Serebrin | G06F 9/4812 |
| | | | | 710/269 |
| 2010/0333090 | A1* | 12/2010 | Wright | G06F 9/45516 |
| | | | | 718/1 |
| 2011/0047543 | A1 | 2/2011 | Mohinder | |
| 2011/0061043 | A1 | 3/2011 | Rydh et al. | |
| 2011/0082962 | A1* | 4/2011 | Horovitz | G06F 11/301 |
| | | | | 711/6 |
| 2011/0131572 | A1* | 6/2011 | Elyashev | G06F 9/45533 |
| | | | | 718/1 |
| 2012/0011508 | A1* | 1/2012 | Ahmad | G06F 12/1009 |
| | | | | 718/1 |
| 2012/0054411 | A1* | 3/2012 | Agesen | G06F 9/45537 |
| | | | | 711/6 |
| 2012/0254995 | A1* | 10/2012 | Sallam | G06F 21/554 |
| | | | | 726/22 |
| 2013/0179971 | A1* | 7/2013 | Harrison | G06F 21/55 |
| | | | | 726/23 |
| 2014/0189687 | A1 | 7/2014 | Jung | |
| 2014/0189882 | A1 | 7/2014 | Jung | |

OTHER PUBLICATIONS

EP13866587.2 filed Jul. 27, 2015 Extended European Search Report dated Feb. 10, 2017.

Garfinkel, T. et al. "A Virtual Machine Introspection Based Architecture for Intrusion Detection" Proceedings of the Symposium on Network and Distributed Systemsecurity, Feb. 6, 2003 (Feb. 6, 2003).

PCT/US13/77799 filed Dec. 26, 2013 International Search Report and Written Opinion dated Apr. 28, 2014.

PCT/US13/77838 filed Dec. 26, 2013 International Search Report and Written Opinion dated Apr. 4, 2014.

U.S. Appl. No. 13/869,511, filed Apr. 24, 2013 Final Office Action dated Sep. 19, 2016.

U.S. Appl. No. 13/869,511, filed Apr. 24, 2013 Non-Final Office Action dated Jan. 29, 2016.

U.S. Appl. No. 13/892,800, filed May 13, 2013 Final Office Action dated Jan. 29, 2015.

U.S. Appl. No. 13/892,800, filed May 13, 2013 Non-Final Office Action dated Oct. 3, 2014.

U.S. Appl. No. 13/892,800, filed May 13, 2013 Non-Final Office Action dated Sep. 14, 2015.

U.S. Appl. No. 13/892,800, filed May 13, 2013 Notice of Allowance dated Feb. 3, 2016.

U.S. Appl. No. 13/892,800, filed May 13, 2013 Notice of Allowance dated Jun. 6, 2016.

EP 13866903.1 filed Dec. 26, 2013 Office Action dated Jan. 7, 2019.

* cited by examiner

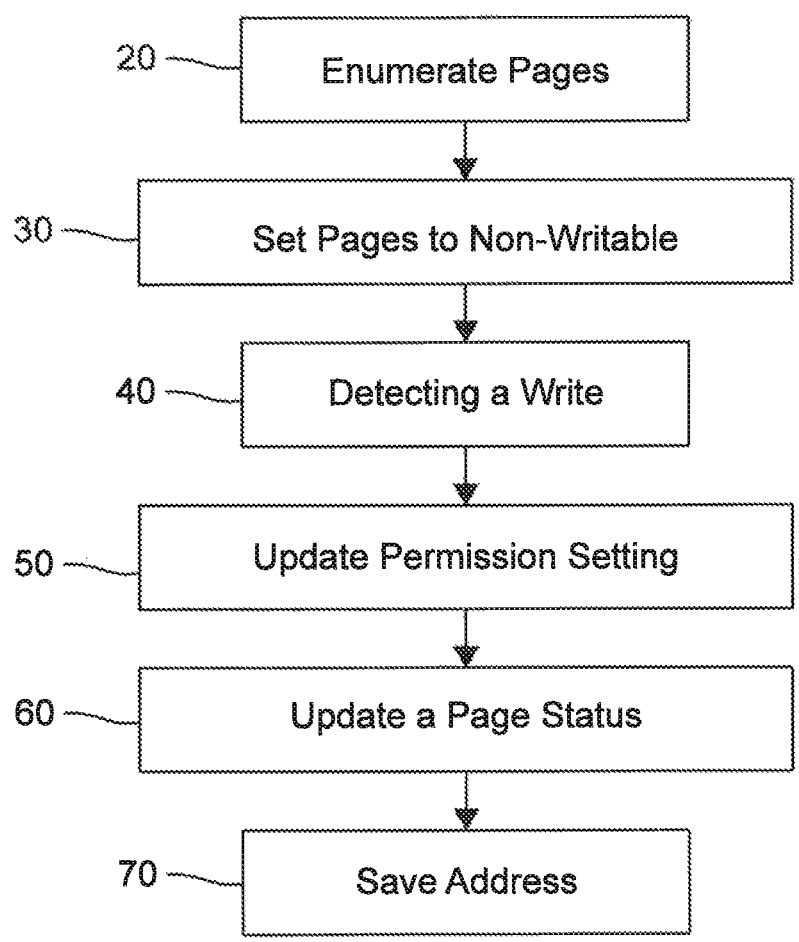

SYSTEM AND METHOD FOR PROGRAMMATIC RUNTIME DE-OBFUSCATION OF OBFUSCATED SOFTWARE UTILIZING VIRTUAL MACHINE INTROSPECTION AND MANIPULATION OF VIRTUAL MACHINE GUEST MEMORY PERMISSIONS

CROSS-REFERENCE TO RELATED APPLICATION

This Patent Application is a continuation application of U.S. patent application Ser. No. 13/892,800 filed May 13, 2013, now U.S. Pat. No. 9,459,901 issued Oct. 4, 2016, which claims priority to U.S. Patent Application Ser. No. 61/747,796 filed Dec. 31, 2012, and titled System and Method for the Programmable Runtime De-Obfuscation of Intentionally Obfuscated Software Utilizing Virtual Machine Introspection and Manipulation of Virtual Machine Guest Memory Permissions, and U.S. Patent Application Ser. No. 61/747,114 titled System And Method To Create A Number Of Breakpoints In A Virtual Machine Via Virtual Machine Trapping Events, and filed Dec. 28, 2012, the entire contents of all of which are incorporated herein by reference.

BACKGROUND

1. Field

The present inventive concept pertains to a system and method to decode obfuscated software. The present inventive concept more particularly concerns a system and method to programmatically runtime de-obfuscate intentionally obfuscated software via virtual machine introspection and manipulation of virtual machine guest memory permissions.

2. Discussion of Related Art

The information security industry routinely seeks to reverse engineer malicious software to determine what malicious behaviors could have been executed on compromised hosts. This process involves the step of taking executable code of the malicious software and disassembling or decompiling to take a higher level view of its functionality.

Reverse engineering malicious software is made more difficult by the standard practice of malware authors of obfuscating executable code as malicious binaries to prevent analysis. According to existing obfuscation strategies, executable code of the malicious software is encoded in a way that makes it unrecognizable as executable code by a disassembler or analyst attempting to perform manual analysis of the malicious software. This process is commonly referred to as "packing." At runtime, when the malicious software executes, the obfuscated executable code of the malicious software is programmatically decoded and then executed. This process of attempting to turn the obfuscated executable code into the form that will be executed is referred to as "unpacking."

At present, there are hundreds of different publicly available software libraries and algorithms that are commonly used by malware authors to accomplish obfuscation. Many of these obfuscation strategies utilize tools which can help make obfuscated code appear different for each unique instance on each infected computer system, for example random number generators.

There are presently a limited number of tools available to detect and de-obfuscate malicious code, but these tools are only effective where certain strategies were used to accomplish obfuscation. These tools are of limited, if any, efficacy in de-obfuscating code obfuscated by other strategies. As a result, the process of analyzing many instances of obfuscated software is often a time consuming, difficult, and manual process that requires specialized reverse engineering expertise. Thus, there is a need for an improved system and method operable to programmatically decode obfuscated software thereby providing increased efficiency.

SUMMARY

The present inventive concept described herein remedies the aforementioned problems by providing a unique system and method operable to programmatically perform runtime de-obfuscation of obfuscated software via virtual machine introspection and manipulation of virtual machine guest memory permissions. The system and method of the present inventive concept is operable to automate the process of de-obfuscating obfuscated malicious software, including by using features commonly exposed in hardware-assisted virtualization platforms.

The aforementioned may be achieved in an aspect of the present inventive concept by providing a method to de-obfuscate obfuscated malicious software. In an aspect of the present inventive concept, the system and method observe a particular piece of analyzed software code, which may be identified and enumerated through at least one of reviewing process tracking structures and matching byte strings in binary executable. The method further includes the step of enumerating a physical page associated with a virtual address space of a piece of analyzed software code. The physical page may be enumerated by traversing a page table to identify physical pages allocated for use by the analyzed software code. The method further includes the step of setting the physical page permission to non-writable, which step may be triggered by execution of the analyzed software code. The method still further includes the step of detecting a write to the physical page, and updating the physical page permission setting to not executable if the write is from the analyzed software. The method may still further include the step of updating the physical page status if (i) an instruction related to the physical page is executed, and/or (ii) the physical page permission is set to not executable to indicate it contains or associated with malware.

Programmatic control, including the ability to control page permissions and update page statuses, of the virtual machine may be provided via instrumentation methods such as that described in U.S. Patent Application Ser. No. 61/747,114 (the "'114 Application"), which is incorporated herein in its entirety by reference. In a preferred embodiment of the present inventive concept, a software module such as an analysis engine is configured to carry out the steps of the method disclosed herein.

The method may further include the steps of saving the memory address written to and/or saving the contents of the physical page for review. In embodiments of the invention, the memory address and/or contents of the physical page are saved in and/or for analysis by an analysis engine. The method may further include the step of reading memory allocated for use by a guest virtual machine via a virtual machine introspection tool. This may help to determine if the write to the physical page is from the analyzed software, and/or to determine the memory address of the first physical page that was written to. More than one physical page may be observed without departing from the spirit of the present inventive concept. For example, all of the physical pages associated with the guest machine's virtual address space, or only those allocated for use by the analyzed software, may be enumerated, depending on user preference or parameters.

Still further, because of the dynamic, run-time environment in which the present system and method may be employed, the method may further include the step of updating the physical page(s) under observation and/or the analyzed software upon occurrence of at least one of (i) a change in virtual address space allocation and (ii) cessation of execution of a first piece of analyzed software. One or more of the resulting, updated physical page(s) and/or analyzed software may be the same as the initial physical page(s) and/or analyzed software under analysis, but the updating feature of the present inventive concept helps ensure the germane software is under analysis despite changes in the virtual machine.

The aforementioned may be achieved in another aspect of the present inventive concept by providing a system to de-obfuscate obfuscated malicious software. The system may include an analysis engine operable to update a physical page status and save the physical page status to memory upon the occurrence of at least one of (i) execution of an instruction associated with a physical page, and (ii) setting of a physical page permission to not executable. The analysis engine may be configured to set the physical page permission to not executable based upon data or an instruction received which indicate the potential presence of malware.

Additional aspects, advantages, and utilities of the present inventive concept will be set forth in part in the description which follows and, in part, will be obvious from the description, or may be learned by practice of the present inventive concept.

The foregoing is intended to be illustrative and are not meant in a limiting sense. Many features and sub-combinations of the present inventive concept may be made and will be readily evident upon a study of the following specification and accompanying drawings comprising a part thereof. These features and sub-combinations may be employed without reference to other features and sub-combinations.

BRIEF DESCRIPTION OF THE DRAWINGS

The present inventive concept is described in detail below with reference to the attached drawing figures, wherein:

FIG. 1 is a diagram illustrating an example of a process of the present inventive concept.

The drawing do not limit the present inventive concept to the specific examples disclosed and described herein. The drawings are not necessarily to scale, emphasis instead being placed upon clearly illustrating the principles of the present inventive concept.

DETAILED DESCRIPTION

The following detailed description references the accompanying drawings that illustrate the present inventive concept. The illustrations and description are intended to describe aspects of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "one embodiment," "an embodiment," or "embodiments" mean that the feature or features being referred to are included in at least one embodiment of the present inventive concept. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present inventive concept can include a variety of combinations and/or integrations of the embodiments described herein. A piece of data or software code is "associated with" or "related to" a physical page in memory if it is saved within that physical page or if that physical page contains data or instructions referring to it.

Many virtualization platforms provide mechanisms to manipulate program behavior of virtual machine guests. These mechanisms, and the components and steps presented herein and in the incorporated references such as instrumentation of execution processes and page permissions, can be used to observe and help understand an internal state of a virtual machine and respond to events in the virtual machine. Utilizing such mechanisms, components and method(s) it is possible to programmatically capture obfuscated executable code of a malicious program after it has been decoded or "unpacked," and before it executes.

This can be accomplished in part through manipulating physical page permissions outside of the guest virtual machine operating system and tracking memory addresses that are written to, for example, during execution within the virtual machine of software that is being analyzed because it is or may comprise malware. The system and method are also operable to keep track of memory addresses associated with subsequent execution of code at the written to physical pages.

Turning to FIG. 1, which illustrates an aspect of the method according to the present inventive concept, at the start of execution of a malicious program, the page permissions of all physical pages within a piece of analyzed software's virtual address space, i.e. those physical that are allocated for use by the analyzed software, are set to not writable. In this manner, writes to those physical pages can be detected. In the preferred embodiment, enumerating the physical pages is accomplished by traversing a page table that defines a virtual to physical memory mapping for the processor.

As discussed in the '114 Application, memory allocated for use by the guest virtual machine may be introspected or read via any number of virtual machine introspection tools. In the preferred embodiment, the method and system of the present inventive concept utilizes the library identified by "LibVMI" to read the memory allocated for use by the guest virtual machine. This is an open source library that provides a mechanism to resolve the virtual to physical page mapping for any process running within a guest virtual machine operating system. While software libraries such as LibVMI are very convenient for this task, this virtual to physical address mapping can be accomplished in a variety of ways without departing from the spirit of the present inventive concept.

In addition, allocation of physical memory space and virtual to physical address mapping, as well as the executing software under analysis, can change over time for example when memory is allocated or de-allocated or a piece of analyzed software stops executing and, as a result, preferred embodiments of the present invention utilize mechanisms for frequent updates. In an aspect of the present inventive concept, the virtual address space and virtual to physical address mapping is updated every time the process or analyzed software changes and/or every time page tables are modified.

In this manner, it is possible to determine what executable code should be under analysis as well as which physical pages of memory contain code interacting with, and that may ultimately perform in conjunction with, the analyzed software. Enumerating what executable code should be under analysis can be accomplished by looking at operating system process tracking structures and/or by matching byte strings contained in the binary executable.

Finally, it should be noted that the virtual memory space is not simply limited to user privilege level processes running underneath an operating system. Rather, the present inventive concept may be used for system level processes and/or as an operating system kernel to analyze software running at any privilege layer.

Returning to description of a method of the present inventive concept, after enumerating all physical pages of memory allocated for use by the analyzed software and that are to be observed, all such physical pages are set to not-writable. In this manner, whenever such regions of memory are written to it will be apparent, preferably through notification to an analysis engine of the present inventive concept.

Programmatic control, for example the ability to control page permissions and update page statuses, may be provided via instrumentation as described in the '114 Application, which among other things allows for registration to receive events such as control register accesses, access violations, single step instructions, and/or INT3, and/or and for modification of guest execution behavior, e.g., by setting page permissions and/or single-stepping mode. In the preferred embodiment of the present inventive concept, the method utilizes a hypervisor virtualization platform such as that sold under the trademark XEN® for x86 architecture. It is foreseen, however, that the present inventive concept may utilize any virtualized environment for such instrumentation, including to instrument memory permissions for physical pages allocated for use by a guest virtual machine.

One of the advantages of the present inventive concept arises from the fact that, in many virtualization platforms that use EPT or hardware-assisted paging, it is not possible for executable code running within the virtual machine to know that physical page permissions are being manipulated. This is because the permissions that are being modified on the actual page permissions reside outside of the virtual machine operating system. Code running within the operating system are given an entirely different set of permissions.

Further, in an aspect of the present inventive concept, if a physical page that is marked not writable is written to, the analysis software engine will be notified of the event. By analyzing memory through virtual machine introspection, for example according to the techniques of the '114 Application, it is possible to determine which code in memory is causing the write and/or which location in memory is being written to. If the write is coming from the piece of analyzed software, then it is preferable to make note of the written to memory address and to carefully track whether code or an instruction at such address is executed. In the instance that code at one or more of these memory addresses are executed, such locations may be identified as de-obfuscated software.

To track execution of code at the memory address(es), their associated physical page permissions are set to not executable and information about those memory addresses which were written to is saved, preferably in the analysis engine. If code in a not-executable physical page is executed, then it will be apparent, preferably through a notification to the analysis engine. It can then be concluded that the physical page(s) contains obfuscated code. According to the present inventive concept, execution of the piece of analyzed software may be instrumented such that, before the first instruction of the newly enumerated de-obfuscated code is executed, it is apparent to the software or user managing execution of the steps of the method, for example through notification to the analysis engine. Because at this point the de-obfuscated code and its location within one or more physical pages has been determined, it is possible to store the contents of all such physical pages and associated information for analysis, preferably prior to actual execution of the de-obfuscated code.

Finally, it should be noted that the present inventive concept is iterative in that it can detect multiple stages of obfuscation. It is common for malware authors to use several layers of encoding to try and hide what their malicious programs are doing. Therefore, the present inventive concept is operable to handle multiple layers of decoding obfuscated executable code. It is operable to track the memory addresses of data and code utilized in conjunction with a piece of analyzed software in a manner sufficient to capture obfuscated code even where the obfuscated code is stored in multiple locations within memory, potentially across several different physical pages.

For example, consider executable code obfuscated in two stages, e.g., obfuscated in binary stored in two different areas of memory. The first stage of de-obfuscation that occurs in conjunction with execution of a piece of analyzed software would occur at a first area of memory, and a first set of malicious code would be unpacked from that area and saved in executable, de-obfuscated format to a second area of memory. The contents of the first area of memory and the second area of memory, and the relevant memory addresses, may be stored according to the present inventive concept, for example at the moment before the first set of unpacked malicious code executes from the second area of memory. Upon execution of this first set of malicious code, a second set of malicious code obfuscated in binary stored in the second area of memory may be unpacked as well and saved into a third area of memory. The contents of the second area of memory and the third area of memory, and the relevant memory addresses, may be saved according to the present inventive concept, for example at the moment before the second set of unpacked malicious code executes from the third area of memory.

In this manner, the present inventive concept is operable to handle multiple layers of decoding obfuscated executable code. It is operable to function on multiple layers of identifying writes to not writable pages and then subsequently identifying executed instructions on not executable pages. There is no limit to the number of cycles in detecting code being decoded.

In this manner, the present inventive concept provides a system and method operable to programmatically perform runtime de-obfuscation of obfuscated software via virtual machine introspection and manipulation of virtual machine guest memory permissions The previous description of the presently disclosed inventive concept is provided to enable any person skilled in the art to make or use the present inventive concept. Various modifications will be readily apparent to those skilled in the art, and the generic principles defined herein may be applied alternatively without departing from the spirit or scope of the present inventive concept. Thus, the present inventive concept is not intended to be limited to the description herein but is to be accorded the widest scope consistent with the principles and novel features disclosed herein.

The steps of a method, system, or operation described in connection with the present inventive concept disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Having now described the features, discoveries and principles of the present inventive aspect of this disclosure, the manner in which the present inventive aspect is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the present inventive aspect herein described, and all statements of the scope of the present inventive aspect which, as a matter of language, might be said to fall there between.

What is claimed is:

1. A computerized method for performing runtime analysis of software code in a virtual machine, the method comprising:
    enumerating at least a first physical page corresponding to a first virtual address space of software code under analysis, the analysis occurring during runtime within the virtual machine, the first virtual address space being a first portion of a virtual address space associated with the virtual machine;
    setting a permission of the first physical page to a non-writable permission, wherein the first physical page resides outside of the virtual machine;
    performing, via virtual machine introspection, runtime de-obfuscation of the software code under analysis including
        (i) tracking locations in the first virtual address space that are written to during analysis,
        (ii) tracking locations in the first virtual address space at which an instruction of the software is executed during analysis, and
        (iii) detecting when a first virtual location in the first virtual address space was written to and an instruction located at the first virtual location is executed, wherein the first virtual location corresponds to a first physical location in the first physical page having a permission of non-writable; and
    responsive to detecting the first virtual location was written to and the instruction located at the first virtual location is executed, determining that the instruction at the first virtual location corresponds to obfuscated malicious software code.

2. The computerized method of claim 1 further comprising updating a permission of the first physical page to non-executable in response to the write to the first physical page being from the first piece of the analyzed software code.

3. The computerized method of claim 2, wherein the first virtual address space and the virtual-to-physical address memory mapping is updated every time a process changes, the first piece of the analyzed software changes, or the page table changes.

4. The computerized method of claim 1, wherein the enumerating of the first physical page comprises traversing a page table that defines a virtual-to-physical memory mapping for a processor or conducting an analysis of operating system process tracking structures.

5. The computerized method of claim 1, wherein the enumerating of the first physical page comprises comparing byte strings contained in the first piece of analyzed software code being a binary executable.

6. The computerized method of claim 1, wherein the detecting of the write to the first physical page comprises tracking a memory address associated with the first physical page that is written to by the first piece of analyzed software code operating in the virtual machine.

7. The computerized method of claim 1, wherein the detecting of the write to the first physical page occurs after de-obfuscation a second piece of the analyzed software code that corresponds to the first piece of analyzed software code.

8. The computerized method of claim 1, wherein the introspection of the virtual machine comprises utilizing a library to read memory allocated for use by the virtual machine.

9. A computerized method for performing runtime de-obfuscation of obfuscated malicious software code in a virtual machine, the method comprising:
    providing a virtual address space and a virtual-to-physical address mapping for use in execution of a first piece of software code, the virtual address space being a portion of a virtual address space associated with the virtual machine;
    during runtime of the virtual machine, updating the virtual address space and the virtual-to-physical address mapping in response to at least (i) a process change, (ii) a change of software code being analyzed, or (iii) a change in at least one page table associated with the virtual-to-physical address mapping, and
    performing, via virtual machine introspection, runtime de-obfuscation of the first piece of software code being analyzed including
        (i) detecting when a first virtual location in the first virtual address space was written to and, subsequently, software code at the first virtual location was executed, wherein the first virtual location corresponds to a first physical location in the first physical page having a permission of non-writable, and
        (ii) determining that the software code at the first virtual location corresponds to obfuscated software code.

10. The computerized method of claim 9, wherein the process change includes a write operation conducted on a first physical page that is associated with the virtual address space and set to a non-writable permission.

11. The computerized method of claim 9, wherein the process change includes detecting a write operation conducted on a first physical page that is associated with the virtual address space and set to a non-writable permission.

12. The computerized method of claim 11, wherein the detecting of the write operation comprises tracking a memory address associated with the first physical page that is written to by the first piece of analyzed software code operating in the virtual machine.

13. The computerized method of claim 11, wherein the detecting of the write operation occurs after de-obfuscation a second piece of the analyzed software code that corresponds to the first piece of software code.

14. A system comprising:
a processor; and
a storage medium communicatively coupled to the processor, the storage medium includes one or more software modules that, upon execution by the processor, perform operations that comprise
enumerating at least a first physical page corresponding to a first virtual address space of software code under analysis, the analysis occurring during runtime within the virtual machine, the first virtual address space being a first portion of a virtual address space associated with the virtual machine;
setting a permission of the first physical page to a non-writable permission, wherein the first physical page resides outside of the virtual machine;
performing, via virtual machine introspection, runtime de-obfuscation of the software code under analysis including
(i) tracking locations in the first virtual address space that are written to during analysis,
(ii) tracking locations in the first virtual address space at which an instruction of the software is executed during analysis, and
(iii) detecting when a first virtual location in the first virtual address space was written to and an instruction located at the first virtual location is executed, wherein the first virtual location corresponds to a first physical location in the first physical page having a permission of non-writable; and
responsive to detecting the first virtual location was written to and the instruction located at the first virtual location is executed, determining that the instruction at the first virtual location corresponds to obfuscated software code.

15. The system of claim 14, wherein the one or more modules, upon execution by the processor, further perform an operation of updating a permission of the first physical page to non-executable in response to the write to the first physical page being from the first piece of the analyzed software code.

16. The system of claim 14, wherein the enumerating of the first physical page, upon execution of the one or more software modules, comprises traversing a page table that defines a virtual-to-physical memory mapping for a processor or conducting an analysis of operating system process tracking structures.

17. The system of claim 14, wherein the enumerating of the first physical page, upon execution of the one or more software modules, comprises comparing byte strings contained in the first piece of analyzed software code being a binary executable.

18. The system of claim 14, wherein the detecting of the write to the first physical page, upon execution of the one or more software modules, comprises tracking a memory address associated with the first physical page that is written to by the first piece of analyzed software code operating in the virtual machine.

19. The system of claim 14, wherein the detecting of the write to the first physical page, upon execution of the one or more software modules, occurs after de-obfuscation a second piece of the analyzed software code that correspond to the first piece of analyzed software code.

20. The system of claim 14, wherein the introspection of the virtual machine comprises utilizing a library to read memory allocated for use by the virtual machine.

* * * * *